2,765,636

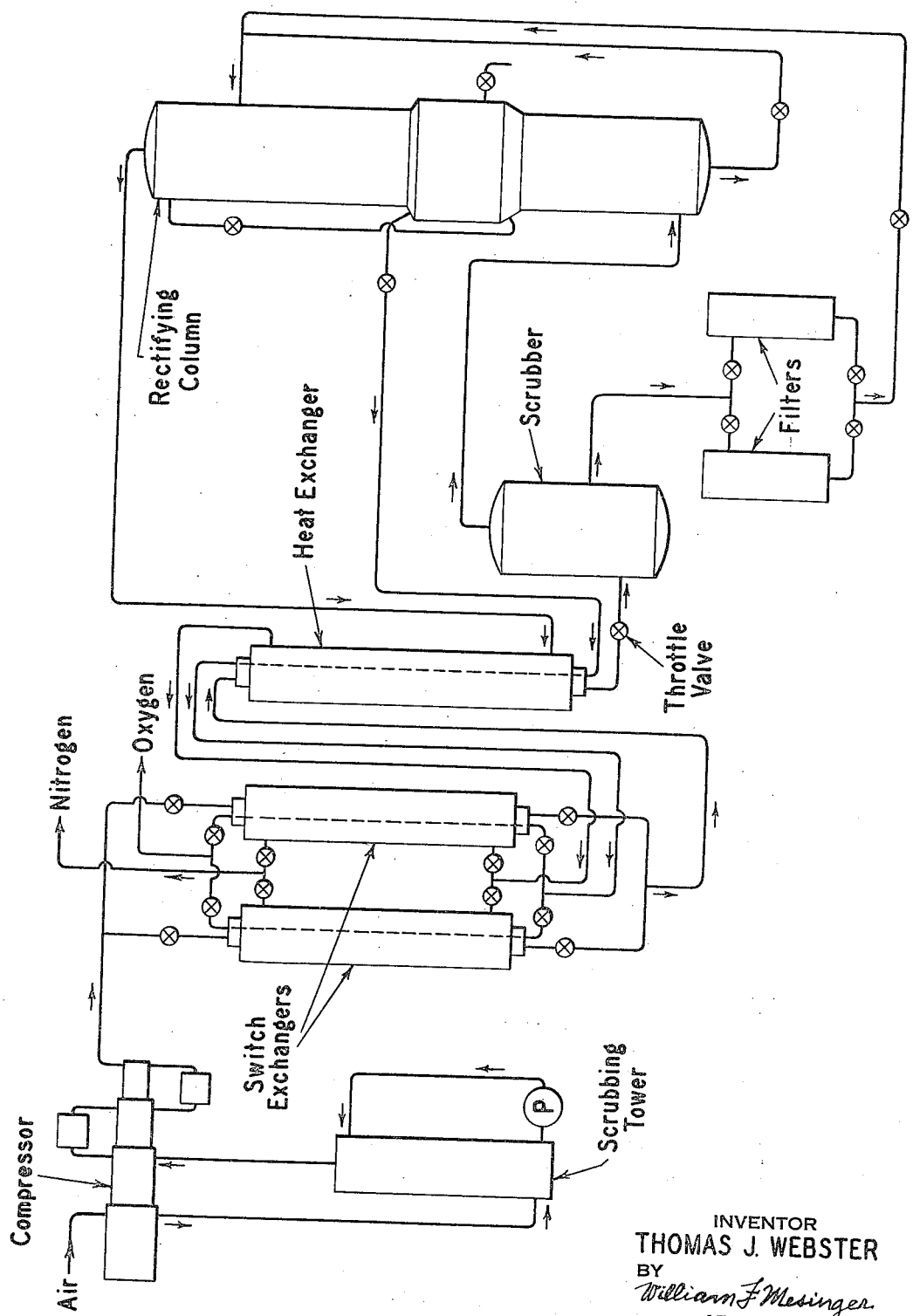

PROCESS FOR THE SEPARATION OF AIR

Thomas John Webster, London, England, assignor to The British Oxygen Company Limited, a British company Application October 22, 1952, Serial No. 316,319

1 Claim. (Cl. 62—175.5)

This invention relates to the separation of air by liquefaction and subsequent rectification.

In the low temperature separation of air it is necessary to remove the naturally occurring carbon dioxide from the air, in order to prevent the deposition of carbon dioxide as solid in the plant heat exchangers and the rectification units.

In order to protect fully both heat exchangers and rectification units, it has heretofore been customary to reduce the carbon dioxide content of the air entering the plant to a value of about 3 parts per million. This almost complete removal of the carbon dioxide from the air entails, of course, a purification apparatus of considerable size, and on large separation plants where considerable quantities of air have to be treated, the provision of a purification stage of the requisite size is frequently impracticable. Moreover, the reduction of the carbon dioxide content to 3 parts per million requires a considerable consumption of the chemicals used to remove the carbon dioxide from the air.

It is known, however, that where a plant is operating under a pressure of above 40 atmospheres, it is not necessary to remove any carbon dioxide from the air in order to protect the heat exchangers, so long as the temperature of the air in the exchangers is not allowed to fall below $-150°$ C., since under these conditions of temperature and pressure, the normal carbon dioxide content of the air entering the plant is below saturation value and consequently the carbon dioxide will pass through the exchangers without condensation. This carbon dioxide will be precipitated in the liquid air formed during the subsequent liquefaction and can be removed therefrom by filtration in order to protect the rectification unit.

To obtain the maximum thermodynamic efficiency from certain liquefaction cycles, it is necessary to cool the air in the heat exchangers to about $-170°$ C. and the above method cannot therefore be applied without modification on plants operated in this manner.

It is an object of the present invention to provide a method for the low temperature separation of air which, while fully protecting the plant heat exchangers and rectification units, enables the size of the purification stage and the consumption of chemicals therein to be decreased, whilst permitting the plant to be operated at its maximum thermodynamic efficiency.

It has now been found that if the carbon dioxide content of the air is reduced to a value of not more than 100 parts per million, the carbon dioxide will not be deposited when the purified air, compressed to above 40 atmospheres, is passed through the heat exchangers, even when the air is cooled to a temperature of about $-170°$ C. therein.

According to the present invention, therefore, a process for the separation of air by liquefaction and subsequent rectification comprises reducing the carbon dioxide content of the air to not more than 100 parts per million, or within a small range below such maximum compressing the air to at least 40 atmospheres pressure, cooling the compressed air in heat exchangers, liquefying at least a part of the cooled compressed air whereby the residual carbon dioxide is precipitated as solid therein, removing the precipitated carbon dioxide from the liquid air, and thereafter feeding the air to a rectification zone.

Since the initial reduction of the carbon dioxide content of the air is only to 100 parts per million or to within a small range therebelow, the purification apparatus necessary is considerably smaller than would be required to reduce the carbon dioxide content of the air to 3 parts per million and the quantity of chemicals used is also proportionately smaller.

Referring now to the accompanying drawing which shows a flow diagram of an exemplary air separation system for the practice of the present invention, the process is preferably carried out by scrubbing the air with a liquid or solution that absorbs $CO_2$ to the degree desired for example, a solution of caustic soda, or lime water, or by passage through a bed of lime. A single stage of scrubbing, more complete saturation of the chemical, and smaller equipment are required for reduction of the carbon dioxide content to a value equal to or a small amount below 100 parts per million. The scrubbing may be effected in the Scrubbing Tower after a first stage of compression in the Compressor and before the final stages of compression to pressures above 40 atmospheres. The compressed air is then dried to remove moisture, for example, by freezing out the moisture in the initial or Switch Heat Exchangers, or by the use of adsorbent traps. The air may then be further cooled by passage through the Heat Exchanger to temperatures below $-150°$ C. and as low as about $-170°$ C. without liability of clogging the Heat Exchanger passage with carbon dioxide deposits. A considerable amount of the cooling may be accomplished by indirect countercurrent heat exchange with cold air separation products in a customary manner, the balance being provided by expansion of the air supplemented if desired by externally supplied refrigeration.

The cooled air is subjected to liquefaction as usual by heat exchange with cold separation products or by heat exchange with expanded air, or both, so that at least a portion is liquefied and then after pressure reduction the residual carbon dioxide becomes precipitated in the form of solid particles. The entire air stream, partly in liquid state, may be then treated to remove the carbon dioxide by filtering so that a substantially immaterial amount of gaseous and dissolved carbon dioxide remains. Alternatively the unliquefied portion of air may be intimately mixed with the liquefied portion, or after expansion through the Throttle Valve may be scrubbed with the liquid portion in the Scrubber and then separated from the liquid portion after which the liquid is cleaned of carbon dioxide in the Filters and both portions passed to the Rectifying Column. The cleaning may be accomplished by filtering or by contact with an adsorbent in addition to filtering. It is customary to install filters and adsorbent traps in duplicate so that cleaning and regeneration of one set can take place while the other set is in operation.

Removal of substantially all of the small traces of hydrocarbon impurities in air is also accomplished by the scrubbing with liquid air and filtering. A further advantage of the present process results from the action of the precipitated carbon dioxide to act as a filter-aid for promoting the simultaneous removal of hydrocarbon impurities, and acting as a diluent that reduces the possible danger of accumulation of a quantity of solidified hydrocarbon impurities bathed by a liquid rich in oxygen.

What is claimed is:

A process for the separation of air by liquefaction and rectification which comprises treating the air for the removal of carbon dioxide sufficiently to reduce its carbon dioxide content to within a small range not substantially below a maximum of 100 parts per million; compressing the treated air to at least 40 atmospheres pressure; cooling the compressed air in heat exchangers to temperatures below −150° C.; liquefying at least part of the cooled compressed air and expanding the air sufficiently to effect precipitation of residual carbon dioxide in solid particle state; removing the precipitated carbon dioxide from the air; and feeding such cleaned air to a rectification zone.

References Cited in the file of this patent

UNITED STATES PATENTS

| | | |
|---|---|---|
| 2,128,692 | De Baufre | Aug. 30, 1938 |
| 2,337,474 | Kornemann | Dec. 21, 1943 |
| 2,448,491 | Latham | Aug. 31, 1948 |
| 2,503,939 | De Baufre | Apr. 11, 1950 |
| 2,537,046 | Garbo | Jan. 9, 1951 |
| 2,619,810 | Rice | Dec. 2, 1952 |
| 2,620,637 | Schilling | Dec. 9, 1952 |
| 2,640,332 | Keyes | June 2, 1953 |
| 2,668,425 | Skaperdas | Feb. 9, 1954 |
| 2,671,324 | Trumpler | Mar. 9, 1954 |

OTHER REFERENCES

Separation of Gases, by M. Ruhemann (1940), pp. 158–165.